(12) United States Patent
Yokota et al.

(10) Patent No.: US 12,455,993 B2
(45) Date of Patent: *Oct. 28, 2025

(54) INFORMATION PROCESSING APPARATUS AND INFORMATION PROCESSING METHOD

(71) Applicants: Kioxia Corporation, Tokyo (JP); KABUSHIKI KAISHA TOSHIBA, Tokyo (JP)

(72) Inventors: Satoru Yokota, Yokohama (JP); Daiki Kiribuchi, Ota (JP); Takeichiro Nishikawa, Yokohama (JP); Tadayoshi Uechi, Kawasaki (JP); Soh Koike, Tachikawa (JP)

(73) Assignees: Kioxia Corporation, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 1084 days.

This patent is subject to a terminal disclaimer.

(21) Appl. No.: 17/472,108

(22) Filed: Sep. 10, 2021

(65) Prior Publication Data

US 2022/0237348 A1    Jul. 28, 2022

(30) Foreign Application Priority Data

Jan. 26, 2021    (JP) ................. 2021-010522

(51) Int. Cl.
*G06F 30/27*    (2020.01)
*G06F 119/02*    (2020.01)
*G06N 20/00*    (2019.01)

(52) U.S. Cl.
CPC ............. *G06F 30/27* (2020.01); *G06N 20/00* (2019.01); *G06F 2119/02* (2020.01)

(58) Field of Classification Search
CPC ...... G06F 30/27; G06F 2119/02; G06N 20/00
(Continued)

(56) References Cited

U.S. PATENT DOCUMENTS 8,195,697 B2 *    6/2012    Maeda .................... G06F 30/30
                                                    716/139
11,423,263 B2 *    8/2022    Kobayashi .............. G06F 17/18
(Continued)

FOREIGN PATENT DOCUMENTS

JP    2017-90947 A    5/2017
JP    2018-73360 A    5/2018
(Continued)

OTHER PUBLICATIONS

Lang et al. (Reduced Order Model Based on Principal Component Analysis for Process Simulation and Optimization, Energy & Fuels 2009, 23, 1695-1706) (Year: 2009).*
(Continued)

*Primary Examiner* — Iftekhar A Khan
(74) *Attorney, Agent, or Firm* — Oblon, McClelland, Maier & Neustadt, L.L.P.

(57) ABSTRACT

An information processing apparatus has an output data acquisition unit configured to acquire an output value obtained by performing an experiment or simulation based on an input parameter of a predetermined number of dimensions, an evaluation value calculation unit configured to calculate and output an evaluation value of the output value, an outlier processing unit configured to output a converted evaluation value including a specified value obtained by converting the evaluation value that does not satisfy a predetermined criterion, a next input parameter determination unit configured to determine a next input parameter based on the input parameter and the converted evaluation value corresponding to the input parameter, and an iteration determination unit configured to repeat processing of the output data acquisition unit, the evaluation value calculation unit, the outlier processing unit, and the next input parameter
(Continued)

determination unit until a predetermined condition is satisfied.

26 Claims, 13 Drawing Sheets

(58) Field of Classification Search
USPC .................................................................. 703/6
See application file for complete search history.

(56) References Cited

U.S. PATENT DOCUMENTS

| | | | |
|---|---|---|---|
| 11,461,515 B2 | 10/2022 | Kiribuchi et al. | |
| 12,190,239 B2* | 1/2025 | Kakizaki | G06F 18/2413 |
| 2010/0251039 A1* | 9/2010 | Hirohata | G06F 3/0685 |
| | | | 714/704 |
| 2014/0176760 A1* | 6/2014 | Taguchi | G06T 5/70 |
| | | | 348/224.1 |
| 2016/0267217 A1* | 9/2016 | Takemura | G06F 30/398 |
| 2017/0228639 A1* | 8/2017 | Hara | G06N 7/01 |
| 2018/0018565 A1* | 1/2018 | Kurokawa | G11C 19/28 |
| 2018/0046926 A1* | 2/2018 | Achin | G06F 9/5011 |
| 2019/0287010 A1* | 9/2019 | Imamura | G06N 20/00 |
| 2020/0042896 A1* | 2/2020 | Ko | G06N 5/01 |
| 2020/0050717 A1* | 2/2020 | Kiribuchi | G06F 30/20 |
| 2021/0012231 A1* | 1/2021 | Uchigaito | G06N 10/00 |
| 2021/0241172 A1* | 8/2021 | Tanaka | G06N 3/0495 |
| 2021/0279575 A1* | 9/2021 | Komatsu | G06F 18/285 |
| 2022/0207401 A1* | 6/2022 | Ito | G06N 20/10 |
| 2022/0237348 A1* | 7/2022 | Yokota | G06F 30/27 |
| 2022/0245919 A1* | 8/2022 | Sano | A61B 5/441 |

FOREIGN PATENT DOCUMENTS

| | | |
|---|---|---|
| JP | 2019-113985 A | 7/2019 |
| JP | 2020-27370 A | 2/2020 |

OTHER PUBLICATIONS

Li et al. (High Dimensional Bayesian Optimization Using Dropout, JCAI-2017, pp. 2096-2102) (Year: 2017).*

Futakado, Naohide, "2021, Beginning of Manufacturing AI Utilization ~Basic AI Knowledge You Need to Know~ Explanation 3, Key points for applying AI prediction technology to manufacturing error reform," Factory Management, vol. 67, No. 2, Feb. 1, 2021, 16 pages (with unedited computer-generated English translation).

Martinez-Cantin, R. et al. "Filtering Outliers in Bayesian Optimization", 31st Conference on Neural Information Processing Systems (2017), 6 pages.

Martinez-Cantin, R. "Practical Bayesian optimization in the presence of outliers" Proceedings of the 21st International Conference on Artificial Intelligence and Statistics. PMLR: vol. 84 (2018), 10 pages.

* cited by examiner

| x1 | 0.5 |
| --- | --- |
| x2 | 230 |
| x3 | 12 |
| ... | ... |
| x11 | 0.35 |

FIG. 2A

| y1 | 0.5 |
| --- | --- |
| y2 | 230 |
| y3 | 12 |
| ... | ... |
| y20 | 1 |

FIG. 2B

| x1  | x2  | x3 | ... | x11  | y1   | y2  | y3  | ... | y20 |
|-----|-----|----|-----|------|------|-----|-----|-----|-----|
| 0.5 | 230 | 12 | ... | 0.35 | 0.5  | 230 | 12  | ... | 1   |
| 1   | 260 | 37 | ... | 0.42 | 0.33 | 404 | 6   | ... | 9   |
| ... | ... | ...| ... | ...  | ...  | ... | ... | ... | ... |
| 2   | 300 | 40 | ... | 0.58 | 0.71 | 594 | 22  | ... | 0   |

FIG. 3

| $\bar{y}$ | $\bar{\bar{y}}$ |
|---|---|
| 0.5 | 0.5 |
| 0.33 | 0.33 |
| ... | |
| 0.7 | 0.7 |
| 0.9 | 0.7 |
| 1.0 | 0.7 |

FIG. 4

|     |     |     |
| --- | --- | --- |
| x1  | 0   | 1   |
| x2  | 0.72 | 0.88 |
| x3  | 0   | 1   |
| ... | ... | ... |
| x11 | 0.45 | 0.55 |

FIG. 9C

|     |     |     |
| --- | --- | --- |
| x1  | 0   | 1   |
| x2  | 0.8 | 0.8 |
| x3  | 0   | 1   |
| ... | ... | ... |
| x11 | 0.5 | 0.5 |

FIG. 9B

|     |     |     |
| --- | --- | --- |
| x1  | 0   | 1   |
| x2  | 0   | 1   |
| x3  | 0   | 1   |
| ... | ... | ... |
| x11 | 0   | 1   |

FIG. 9A

INFORMATION PROCESSING APPARATUS AND INFORMATION PROCESSING METHOD

CROSS REFERENCE TO RELATED APPLICATIONS

This application is based upon and claims the benefit of priority from the prior Japanese Patent Application No. 2021-010522, filed on Jan. 26, 2021, the entire contents of which are incorporated herein by reference.

FIELD

An embodiment of the present invention relates to an information processing apparatus and an information processing method.

BACKGROUND

Simulators are utilized for various purposes. It is necessary to adjust a value of an input parameter of a simulator in order to simulatively perform operation of a complicated event in the simulator or obtain an ideal result in the simulation. For example, when an evaluation function that calculates an error between output data of a simulator and ideal output data as an evaluation value is defined, it is necessary to search for a value of an input parameter with which the minimum evaluation value is obtained.

Simulation of a complex event is time consuming. In order to set an optimal input parameter for a complex simulation within a realistic time, it is necessary to adjust an input parameter with a small number of simulations. Therefore, for example, a method of estimating an evaluation value from an input parameter such as Bayesian optimization and preferentially searching for an input parameter having a small estimated evaluation value has been proposed.

However, in the case of a simulation having a nonlinear characteristic such as a semiconductor product, output data changes steeply with respect to an input parameter, and a value (outlier) greatly deviates from most pieces of output data may be obtained. In this case, the tendency of the evaluation value contributing to the optimization cannot be estimated due to the influence of the outlier, and there is a possibility that the optimal input parameter cannot be set within a realistic time.

BRIEF DESCRIPTION OF THE DRAWINGS

FIG. 2A is a diagram illustrating an example of data stored in an input and output data storage unit;

FIG. 2B is a diagram illustrating an example of output data;

FIG. 3 is a diagram illustrating an example of data stored in an input and output data storage unit 5;

FIG. 4 is a diagram illustrating an example in which evaluation values and corresponding converted evaluation values are arranged in the same row as a set;

FIG. 9A is a diagram illustrating an example of an original search range of input parameters x1, x2, . . . , x11, FIG. 9B is a diagram illustrating an example in which results x2 and x11 obtained by randomly selecting two dimensions among the input parameters are selected, and FIG. 9C is a diagram illustrating a converted search range;

DETAILED DESCRIPTION

According to one embodiment, an information processing apparatus has:
   an output data acquisition unit configured to acquire an output value obtained by performing an experiment or simulation based on an input parameter of a predetermined number of dimensions;
   an evaluation value calculation unit configured to calculate and output an evaluation value of the output value;
   an outlier processing unit configured to output a converted evaluation value including a specified value obtained by converting the evaluation value that does not satisfy a predetermined criterion;
   a next input parameter determination unit configured to determine a next input parameter based on the input parameter and the converted evaluation value corresponding to the input parameter; and
   an iteration determination unit configured to repeat processing of the output data acquisition unit, the evaluation value calculation unit, the outlier processing unit, and the next input parameter determination unit until a predetermined condition is satisfied.

Hereinafter, embodiments of an information processing apparatus and an information processing method will be described with reference to the drawings. Although main components of the information processing apparatus will be mainly described below, the information processing apparatus and the information processing method may include components and functions that are not illustrated or described. The following description does not exclude components and functions that are not illustrated or described.

Figure 1:
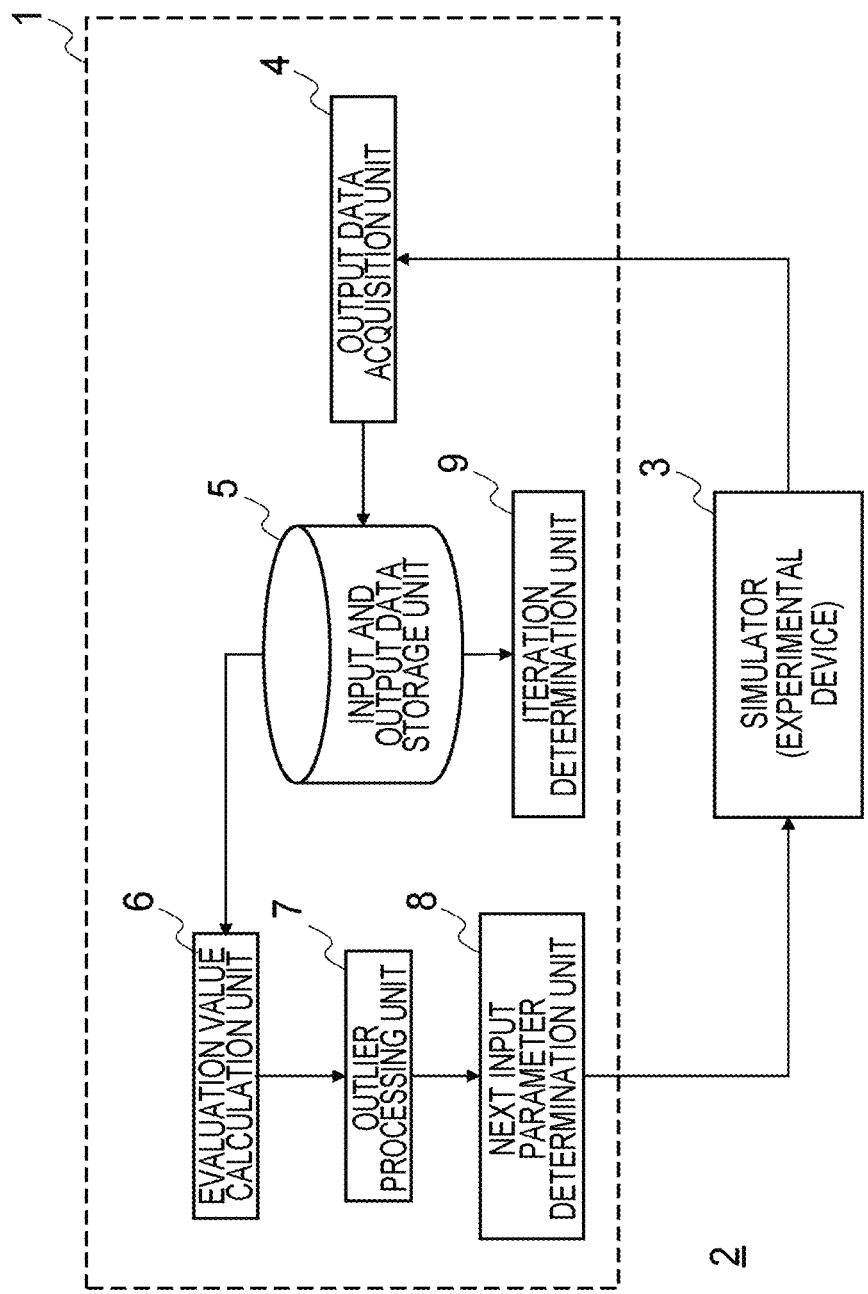
FIG. 1 is a block diagram illustrating a schematic configuration of a simulation system 2 including an information processing apparatus 1 according to an embodiment.

FIG. 1 is a block diagram illustrating a schematic configuration of a simulation system 2 including an information processing apparatus 1 according to an embodiment. The simulation system 2 in FIG. 1 includes the information processing apparatus 1 and a simulator 3. The simulator 3 performs simulation on the basis of input parameters and outputs output data indicating a simulation result. The information processing apparatus 1 optimizes input parameters to be input (set) to the simulator 3. Therefore, the information processing apparatus 1 in FIG. 1 can also be referred to as an optimization apparatus.

The simulation system 2 in FIG. 1 can include one or a plurality of computers. In this case, the computer executes a program for performing processing operation of the information processing apparatus 1 and a program for performing processing operation of the simulator 3. Alternatively, at least part of processing operation of the information processing apparatus 1 and the simulator 3 may be executed by dedicated hardware (for example, a semiconductor device such as a signal processing processor).

The information processing apparatus 1 in FIG. 1 does not necessarily need to be connected to the simulator 3. For example, instead of the simulator 3, the information processing apparatus 1 of FIG. 1 may be used together with an experimental device that performs various experiments. That is, the information processing apparatus 1 in FIG. 1 is not necessarily built in the simulation system 2.

The information processing apparatus 1 in FIG. 1 includes an output data acquisition unit 4, an input and output data storage unit 5, an evaluation value calculation unit 6, an outlier processing unit 7, a next input parameter determination unit 8, and an iteration determination unit 9.

The output data acquisition unit 4 acquires output data indicating results of experiments or simulations on the basis of input parameters of a predetermined number of dimensions. In the present specification, it is assumed that there are a plurality of input parameters used in an experiment or input to the simulator 3, and the number of input parameters (the number of items) is referred to as a number of dimensions. The output data acquisition unit 4 may acquire not only output data indicating a result of simulation performed by the simulator 3 but also output data indicating output data indicating an experimental result. Hereinafter, processing of acquiring output data from the simulator 3 and determining a next input parameter to the simulator 3 will be mainly described, but it is also possible to acquire output data from an experimental device instead of the simulator 3 and determine a next input parameter to the experimental device.

The input and output data storage unit 5 stores input parameters and corresponding output data as a set. In the example of FIG. 2A, the input parameters include 11 items $x1, x2, \ldots, x11$, each item having a respective value. The value of each item may be a continuous value, a discrete value, or a categorical variable. Each item of the input parameter may be a physical parameter such as a temperature or a pressure, or may be a parameter related to an experiment such as a processing time or a processing condition. The number of items of the input parameters and the contents of the items are arbitrary.

FIG. 2B is a diagram illustrating an example of output data. In the example of FIG. 2B, the output data includes 20 items $y1, y2, \ldots, y20$, each item having a respective value. The output data indicates a result of performing an experiment using the input parameters or a result of performing a simulation by inputting the input parameters to the simulator 3. More specifically, the output data may be detection data of various sensors used in the experiment, or a physical characteristic value or a measured value of an experimental result or a simulation result.

FIG. 3 is a diagram illustrating an example of data stored in the input and output data storage unit 5. In the example of FIG. 3, the input parameters of FIG. 2A and the corresponding output data of FIG. 2B are grouped and stored in the input and output data storage unit 5.

The evaluation value calculation unit 6 calculates an evaluation value of the output data. The evaluation value is a one-dimensional value with respect to the input parameter. The evaluation value may be one of pieces of output data obtained as a result of an experiment or simulation, or may be a value obtained by operation by combining a plurality of pieces of output data obtained as a result of an experiment or simulation. For example, a difference between output data obtained as a result of an experiment or a simulation and ideal output data may be used as the evaluation value, or a sum or a product of a plurality of pieces of output data obtained as a result of an experiment or a simulation may be used as the evaluation value.

For example, when it is desired to reproduce data measured under a plurality of conditions by simulation, the ideal data may be data actually measured under a plurality of conditions. At this time, in a case where the output data includes 20 items $y1, y2, \ldots,$ and $y20$, $y1, y2, y3, y4,$ and $y5$ are output data in the case of a condition A, $y6, y7, y8, y9,$ and $y10$ are output data in the case of a condition B, $y11, y12, y13, y14,$ and $y15$ are output data in the case of a condition C, and $y16, y17, y18, y19,$ and $y20$ are output data in the case of a condition D, the sum of the differences between the output data and the ideal data in the respective conditions may be used as the evaluation value.

The outlier processing unit 7 calculates a converted evaluation value obtained by converting the evaluation value on the basis of a predetermined specified value. For example, a converted evaluation value $\underline{Y}$ obtained by converting an evaluation value $\underline{y}$ exceeding a specified value $\underline{y_{th}}$ into the specified value with may be output. This conversion formula is expressed by Formula (1). In Formula (1) and the drawings, the specified value $\underline{y_{th}}$ and the evaluation value $\underline{y}$ are indicated by adding bars above "$y_{th}$" and "$y$", and the converted evaluation value $\underline{Y}$ is indicated by adding double bars above lower case "$y$".

In a case of minimization problem of evaluation value, $$\bar{\bar{y}} = \begin{cases} y, & y < y_{th} \\ y_{th}, & y \geq y_{th} \end{cases}$$

In a case of maximization problem of evaluation value, $$\bar{\bar{y}} = \begin{cases} y, & y > y_{th} \\ y_{th}, & y \leq y_{th} \end{cases}$$

An evaluation value exceeding the worse evaluation value with reference to $\underline{y_{th}}$ is converted into $\underline{y_{th}}$.

Here, $\underline{y_{th}}$ may be calculated on the basis of the statistic of the evaluation values obtained so far. For example, $\underline{y_{th}}$ may be a percentile value (order of 100) of the evaluation values obtained so far. The percentile value refers to a value of data located at a certain proportion of the number when pieces of data are arranged in ascending order. When nine evaluation values $\underline{y}=\{1, 2, 3, 4, 5, 6, 7, 8, 9\}$ have been obtained, the 50 percentile value is located at a position obtained by dividing a range [1, 9] into 50/100: 1-50/100, that is, $1-50/100+50/100\times9=5$-th evaluation value κ. In the setting of the minimization problem of the evaluation value, the larger the evaluation value is, the worse the evaluation value is, and thus, among the evaluation values obtained so far, the evaluation value having an evaluation value worse than the specified value $\underline{y_{th}}$, that is, the evaluation value equal to or higher than the 50 percentile value of the evaluation values obtained so far is converted into the 50 percentile value.

What percentile value to be $y_{th}$ may be changed according to the evaluation budget of the optimization. In a case where the specified value=q percentile value, q may be gradually decreased or increased according to the evaluation budget.

Alternatively, a difference between the n percentile value and the m percentile value may be determined as n<m, and $y_{th}$=[n percentile value]+[m percentile value-n percentile value]×[coefficient] in the case of the maximization problem of the evaluation value, and $y_{th}$=[m percentile value]+[m percentile value-n percentile value]×[coefficient] in the case of the minimization problem of the evaluation value. Here, [coefficient] is a value equal to or greater than 0.

Alternatively, $y_{th}$ may be determined using an average value and a standard deviation. For example, the specified value may be [average value of obtained evaluation values] ±[coefficient]×[standard deviation value of obtained evaluation values] (± is set to − in the case of the maximization problem of the evaluation value, and + in the case of the minimization problem of the evaluation value). The [coefficient] may be changed according to the evaluation budget for optimization. The [coefficient] may be gradually decreased or increased. Here, [coefficient] is a value equal to or greater than 0.

Alternatively, a distribution of the evaluation values may be assumed, data having a low occurrence probability may be regarded as an outlier from the distribution, and a maximum value of the evaluation value (this is the case of the minimization problem of the evaluation value, and the minimum value is applied in the case of the maximization problem of the evaluation value) of the data that is not the outlier may be $y_{th}$. For example, assuming that [the square of the difference between the mean value of the evaluation value and the evaluation value] follows a chi-square distribution, a chi-square test may be performed, and the maximum value of the evaluation value (this is the case of the minimization problem of the evaluation value, and the minimum value is applied in the case of the maximization problem of the evaluation value) satisfying a predetermined significance level may be set as the specified value $y_{th}$.

Alternatively, if the outlier data and the non-outlier data are known, the outlier data and the non-outlier data may be learned by a classifier. For example, a support vector machine (SVN) may be used as the classifier, the outlier data and the non-outlier data may be learned in advance, and the maximum value of the evaluation value (this is the case of the minimization problem of the evaluation value, and the minimum value is applied in the case of the maximization problem of the evaluation value) among the data that is not determined to be the outlier by the SVN may be set as the specified value $y_{th}$. The classifier may be a logistic regression, a random forest, or a neural network.

Figure 4:
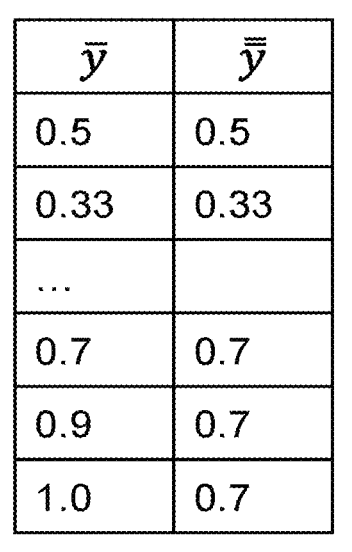

FIG. 4 is a diagram illustrating an example in which evaluation values and corresponding converted evaluation values are arranged in the same row as a set. FIG. 4 illustrates an example in which the evaluation value $y$ is converted into the converted evaluation value $Y$ when the specified value $y_{th}$ is set to 0.7 in the setting of the minimization problem of the evaluation value. Each piece of data in FIG. 4 may be stored in the input and output data storage unit 5 or a storage unit (not illustrated) provided separately from the input and output data storage unit 5.

The next input parameter determination unit 8 determines the next input parameter used in the experiment or input to the simulator 3 on the basis of the set of the converted evaluation value and the corresponding input parameter described above.

For example, the next input parameter may be determined using a black box optimization method on the basis of a set of the converted evaluation value and the corresponding input parameter. The optimization method to be adopted may be a genetic algorithm, or may be an evolution strategy or a covariance matrix adaptation evolution strategy (CMA-ES). The next input parameter may be determined using Bayesian optimization or sequential model-based optimization (SMBO).

The determined next input parameter may be displayed on the display, may be displayed on the experimental device or the simulator using the communication device, or may be directly output to the experimental device or the simulator 3 using the communication device.

The iteration determination unit 9 repeats the processing of the output data acquisition unit 4, the input and output data storage unit 5, the evaluation value calculation unit 6, the outlier processing unit 7, and the next input parameter determination unit 8 until a predetermined condition is satisfied. The predetermined condition may be satisfied, for example, when the number of times of experiments or simulations exceeds a threshold, when the elapsed time from the start of experiments or simulations exceeds a threshold, or when the evaluation value exceeds (or falls below) a threshold. Alternatively, these conditions may be combined.

Figure 5:
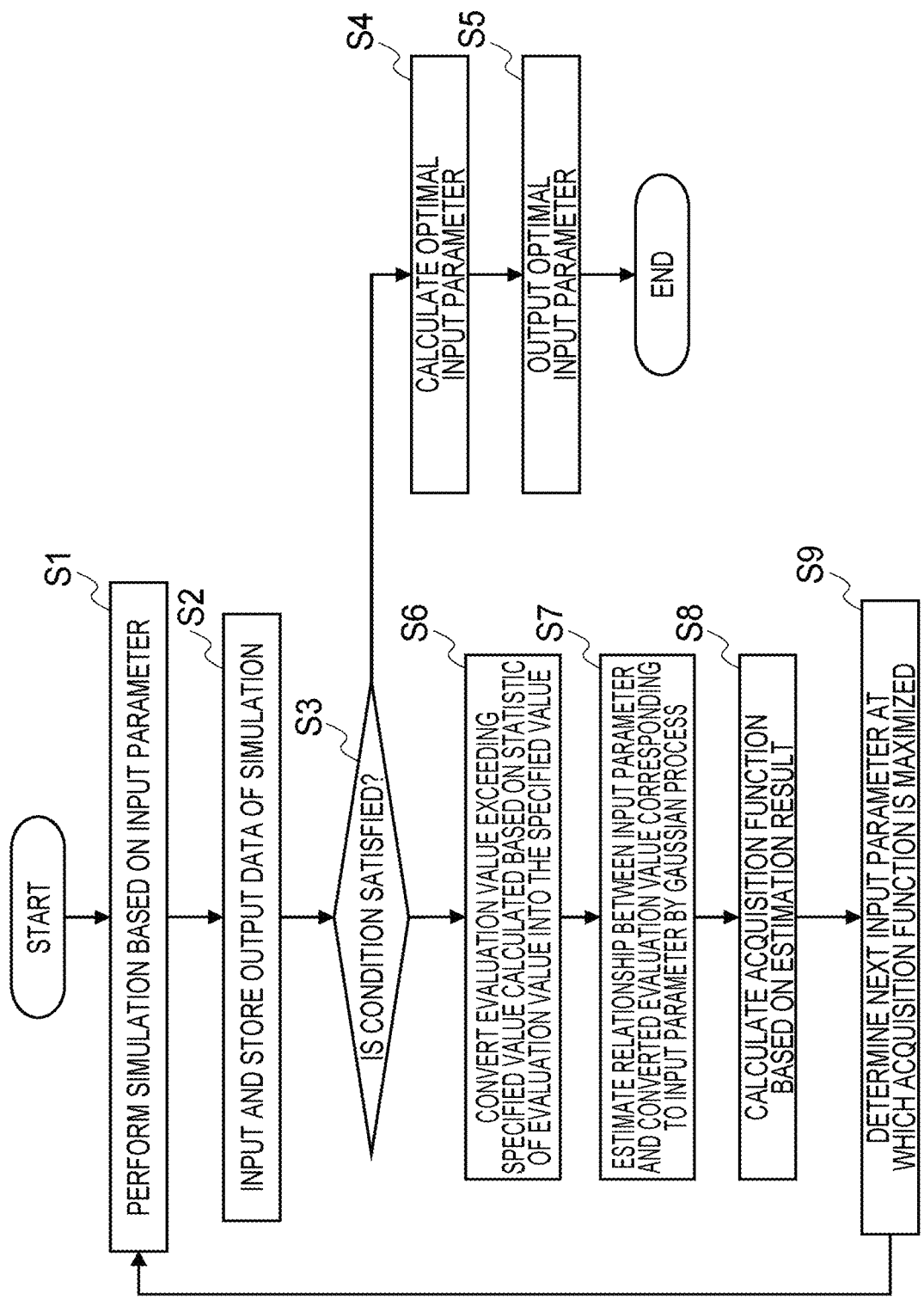
FIG. 5 is a flowchart illustrating an example of processing operation of the simulation system 2.

FIG. 5 is a flowchart illustrating an example of processing operation of the simulation system 2. First, input parameters are input to the simulator 3, and simulation is performed (step S1). In this step S1, the input parameters may be determined using a Latin square or a Sobol column.

Next, the output data acquisition unit 4 acquires output data indicating a simulation result of the simulator 3, and stores the acquired output data in the input and output data storage unit 5 (step S2). When it is determined in step S3 that the predetermined condition is satisfied, an optimal input parameter is calculated (step S4), and the optimal input parameter is output (step S5). In step S4, for example, an input parameter when the evaluation value calculated by the evaluation value calculation unit 6 is maximum (or minimum) may be set as an optimal input parameter. As described above, the information processing apparatus 1 of FIG. 1 may include an optimal input parameter calculation unit that outputs an optimal input parameter.

When it is determined in step S3 that the predetermined condition is not satisfied, the outlier processing unit 7 converts an evaluation value exceeding a specified value among the obtained evaluation values into a specified value (step S6). For example, in a case where a 50 percentile value is used as the specified value, an evaluation value equal to or greater than 50 percentile value (this is the case of minimization of the evaluation value, which is equal to or less than the 50 percentile value in the case of maximization) among the obtained evaluation values is converted into a 50 percentile value, and otherwise, a converted evaluation value in which the original evaluation value is maintained is output. The processing in step S6 may be performed each time the input and output data (evaluation value) stored in the input and output data storage unit increases, or may be performed when a predetermined amount of input and output data is added. For example, the specified value may be gradually decreased from a 50 percentile value to a 40 percentile value and a 30 percentile value so that the search becomes gradually exploitative.

Next, the next input parameter determination unit 8 determines the next input parameter on the basis of a set of the input parameter and the corresponding converted evaluation value (steps S7 to S9). For example, in a case where the Bayesian optimization is used, first, the relationship between the input parameter and the corresponding converted evaluation value is estimated by the Gaussian process (step S7). Next, an acquisition function is calculated on the basis of the estimation result of step S8 (step S8). Finally, next input data that maximizes the acquisition function is determined (step S9). Thereafter, the iteration determination unit 9 repeats the processing of step S1 and subsequent steps until a predetermined condition is satisfied.

As described above, in the first embodiment, the converted evaluation value obtained by converting the evaluation value exceeding the specified value into the specified value is calculated, the next input parameter is determined on the basis of the input parameter and the corresponding converted evaluation value, and the execution of the simulation, the calculation of the converted evaluation value, and the determination of the next input parameter are repeated until a predetermined condition is satisfied.

As a result, in an optimization problem in which a bad outlier greatly deviates from most evaluation values occurs, the bad outlier is converted into a maximum value (in the case of the minimization problem of the evaluation value, the minimum value is applied in the case of the maximization problem) of good evaluation values, and is no longer an outlier.

In general, in a case where a model is trained on input parameters and evaluation values and an optimal evaluation value is calculated on the basis of the model as in Bayesian optimization, the influence of the outlier on the prediction error of the model is large, because the model overfits to bad outliers (in the case of the minimization problem, a large evaluation value) rather than a tendency (in the case of the minimization problem, a small evaluation value) of a good evaluation value that contributes to optimization.

However, according to the present embodiment, since the bad outlier is converted into the maximum value of the good evaluation value, it is possible to learn the tendency of the good evaluation value since overfitting to the bad outliers does not occur while the bad outliers are learned as worse values. Therefore, since it is easier to estimate the tendency of the good evaluation value as compared with the related art, the input parameters can be set more quickly and optimally.

In the case of learning and predicting a fixed data set, a model with higher generalization ability can be learned by simply discarding data exceeding a specified value as an outlier. However, in the case of a model used for optimization, since the model is sequentially updated each time data increases, if data is simply discarded, the model is not updated, and a similar input parameter is easily suggested as an input parameter to be evaluated next. Therefore, instead of discarding the outlier, the processing of converting the outlier into the maximum value of the good evaluation value is effective.

For example, there is an effect of preventing an input parameter that is not actually bad due to abnormality of a measuring instrument or the like from being regarded as a deterministically bad evaluation value.

Second Embodiment

Figure 6:
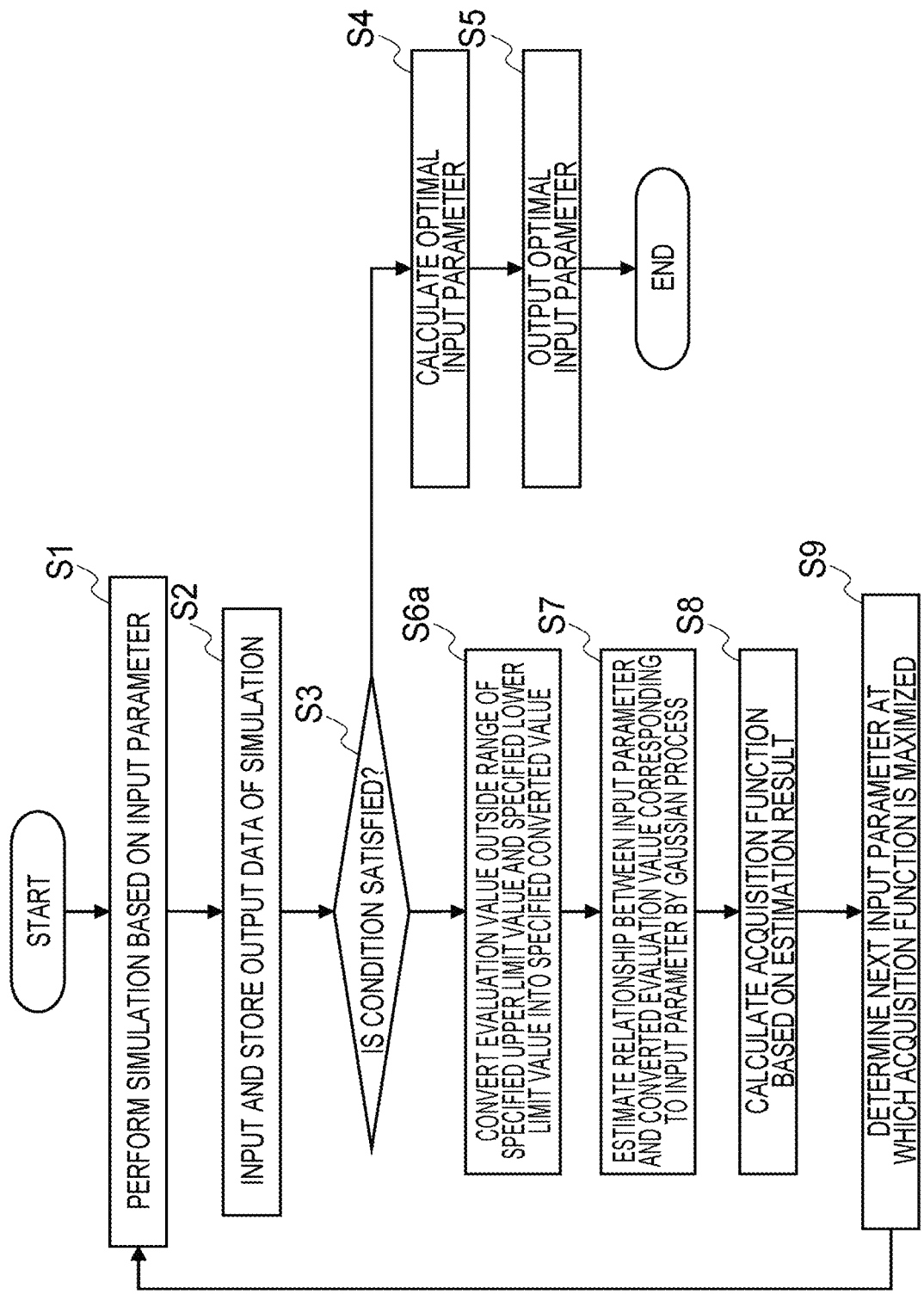
FIG. 6 is a flowchart illustrating an example of processing operation of the simulation system 2 including the information processing apparatus 1 according to a second embodiment.

The internal configuration of the information processing apparatus 1 according to a second embodiment is the same as that of the information processing apparatus 1 in FIG. 1, but the processing of the outlier processing unit 7 is different. FIG. 6 is a flowchart illustrating an example of processing operation of the simulation system 2 including the information processing apparatus 1 according to the second embodiment. FIG. 6 is different from FIG. 5 in that step S6 in FIG. 5 is replaced with step S6a. An outlier processing unit in the second embodiment outputs a converted evaluation value obtained by converting an evaluation value outside the range of the specified upper limit value and the specified lower limit value into a specified value (step S6a).

In the first embodiment, it is mainly assumed that a bad outlier occurs in a specific input parameter as a characteristic of a simulation or experimental device. However, in the second embodiment, a case is mainly assumed where an outlier occurs due to an abnormality of a measuring instrument or measurement noise. Therefore, in the second embodiment, a specified upper limit value and a specified lower limit value are provided in order to cope with an abnormally good evaluation value and an abnormally bad evaluation value.

For example, the specified upper limit value and the specified lower limit value may be determined on the basis of a percentile value, an average value, and a standard deviation value. More specifically, the specified upper limit value and the specified lower limit value may be determined in a similar manner to that in the first embodiment. For example, the specified upper limit value may be set to a designated percentile value, the evaluation value exceeding the specified upper limit value may be converted into the specified upper limit value, the specified lower limit value may be converted into [average value of obtained evaluation values]−[coefficient]×[standard deviation value of obtained evaluation values], and the evaluation value exceeding (falling below) the specified lower limit value may be replaced with the specified lower limit value.

For example, in the case of minimizing the evaluation value, it is a target to obtain an evaluation value smaller than the existing evaluation value, but if the specified lower limit value is large, there is a possibility that a tendency of a smaller evaluation value cannot be grasped. Therefore, the specified lower limit value in a case where it is desired to reduce the evaluation value and the specified upper limit value in a case where it is desired to increase the evaluation value may be set to values that are assumed to be impossible from the knowledge of the user.

In a case where an evaluation value exceeding the specified upper limit value or the specified lower limit value that is assumed to be impossible from knowledge of the user is obtained, the evaluation value may be converted into the specified upper limit value in a case of minimizing the evaluation value and into the specified lower limit value in a case of maximizing the evaluation value so as to avoid the evaluation value exceeding the specified upper limit value or the specified lower limit value that is assumed to be impossible from knowledge of the user. When there is no knowledge of the user but there is data of a similar task in the past, a possible minimum value from the data may be set to the specified lower limit value.

Alternatively, the specified upper limit value and the specified lower limit value may be determined for each input parameter. For example, the relationship between the input parameter and the evaluation value may be estimated using a Gaussian process, and a range of the evaluation value of each input parameter may be estimated. [predicted mean of Gaussian process]+[coefficient]×[predicted standard deviation of Gaussian process] in the evaluated input parameter may be determined as the specified upper limit value, and [predicted mean of Gaussian process]−[coefficient]×[predicted standard deviation of Gaussian process] in the evaluated input parameter may be determined as the specified lower limit value. Regarding the specified value at this time, an evaluation value below the specified lower limit may be converted into the specified lower limit value, and an evaluation value exceeding the specified upper limit may be converted into the specified upper limit value.

An abnormal value due to noise is considered to be neither good nor bad, and a predicted average value may be replaced as an evaluation value outside the specified upper limit value and the specified lower limit value range so that the evaluation value of noise is not reflected in the model.

Alternatively, only in a case where the evaluation value of the next input parameter calculated by the next input parameter determination unit 8 has become a value outside the range of the specified upper limit value and the specified lower limit value, the same input parameter value may be repeatedly evaluated in order to check whether the evaluation value has been accidentally obtained due to noise, and the evaluation value of the next input parameter may be converted to an average value, a median, or a percentile value calculated by the evaluation value calculation unit 6 from a result of the repeated evaluation. The user may be notified that a value outside the range of the specified upper limit value and the specified lower limit value has been obtained.

As described above, in the second embodiment, in a case where it is assumed that an outlier occurs due to noise or abnormality, it is possible to continue optimization while reducing the influence of the outlier. Therefore, there is an effect of reducing rework in which the user confirms that there is the influence of noise or abnormality and performs optimization again when the optimization is not successful.

Third Embodiment

The information processing apparatus 1 according to a third embodiment has the same configuration as the information processing apparatus 1 of FIG. 1, but differs in processing of the outlier processing unit 7. The outlier processing unit 7 in the third embodiment converts the evaluation value into an equal value in which the order is maintained.

For example, all the evaluation values may be converted into a which is a predetermined value. Here, α refers to a value obtained by dividing what percentile value α is by 100 (quantile value). Therefore, $0 \leq \alpha \leq 1$ is satisfied, for example, if the relevant data is a median value of data, it is a 50 percentile value, and $\alpha=50/100=0.5$ is satisfied.

Alternatively, all the evaluation values may be arranged in ascending order, and the order (1, 2, 3, . . . ) may be assigned in order. If the rank of the evaluation value does not change, an equality sequence of 2, 4, 6 may be assigned.

Figure 7:
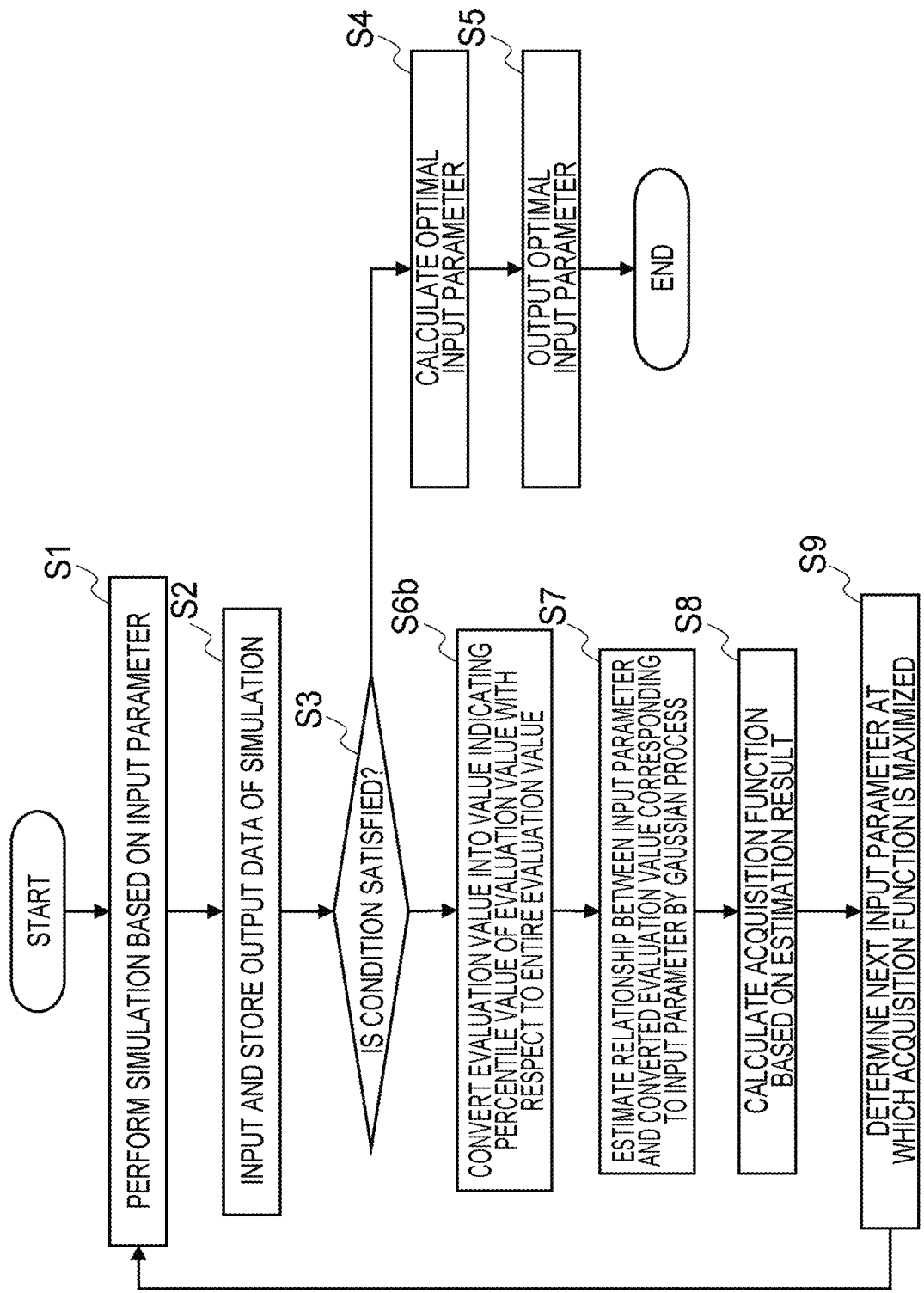
FIG. 7 is a flowchart illustrating an example of processing operation of the simulation system 2 including the information processing apparatus 1 according to a third embodiment.

FIG. 7 is a flowchart illustrating an example of processing operation of the simulation system 2 including the information processing apparatus 1 according to the third embodiment. FIG. 7 is different from FIG. 5 in that step S6 in FIG. 5 is replaced with step S6b. In step S6b, as an example of converting the data in which the evaluation value matches the specified value into a value in which the rank of the evaluation value corresponding to each specified value on a one-to-one basis is stored, the evaluation value is converted into a value indicating the percentile value of the evaluation value with respect to the entire evaluation value.

In step S6b, a converted evaluation value obtained by converting each evaluation value into a quantile value of the evaluation value with respect to the entire evaluation value may be output. For example, when eight consecutive integers 1, 2, 3, . . . , 8 and one outlier 100 are evaluation values, the converted evaluation values may be 0, 0.125, 0.25, . . . , 0.875, 1.0. At this time, the q quantile value indicates [1−q+q×the number of data]-th data when the evaluation values are arranged in ascending order. For example, a 1.0 quantile value indicates 1−1.0+1.0×9=9-th data. In the converted evaluation value obtained by converting the evaluation value into the quantile value, the outlier 100 is converted into 1.0 and is no longer an outlier.

As described above, it is possible to eliminate the outliers while maintain the rank information necessary for the minimum optimization.

Fourth Embodiment

In a fourth embodiment, next input parameters are determined by Bayesian optimization. A schematic configuration of the information processing apparatus 1 according to the fourth embodiment is similar to that in FIG. 1, and thus, description of the block configuration is omitted.

A next input parameter determination unit 8 according to the fourth embodiment has an output result estimation function, an acquisition function calculation function, and an acquisition function maximization function.

The output result estimation function estimates a relational expression of the parameters and the average value of the converted evaluation value, and a relational expression of the parameter and the variance of the converted evaluation values on the basis of a set of the parameters and the corresponding converted evaluation values. As a method of estimating the relational expression between the average value and the variance, Gaussian process regression may be used, or random forest regression may be used. For example, in the case of Gaussian process regression, the parameter of the i-th experiment is xi, and the converted evaluation value is Yi. The average vector of the evaluation values is mi=$\mu_0$ (xi), and the covariance of xi and xj is Ki, j=k (xi, xj). Here, $\mu_0$(xi) is an arbitrary function, and k (xi, xj) is an arbitrary kernel function. The kernel function may be, for example, an exponential square kernel, a matern kernel, or a linear kernel.

At this time, a relational expression $\mu_n(x)$ between the parameter x and the average value of the converted evaluation value $\underline{Y}$ is $\mu_n(x)=\mu_0(x)+k(x)^T(K+\sigma^2 I)^{-1}(\underline{Y}-m)$. Here, ki(x)=k(x, xi), and $\sigma^2$ is an arbitrary constant. A relational expression $\sigma_n^2(x)$ between the parameter x and the variance of the converted evaluation value $\underline{Y}$ is $\sigma_n^2(z)=k(x, x)-k(x)^T(K+\sigma^2 I)^{-1}k(x)$.

The acquisition function calculation function calculates the acquisition function on the basis of the relational expression between the average value and the variance. As the acquisition function, for example, a probability of improvement (PI) may be used, or expected Improvement (EI) may be used. Alternatively, upper confidence bound (UCB), Thompson sampling (TS), entropy search (ES), or mutual information (MI) may be used. For example, in the case of the UCB, the acquisition function $\alpha_n(x)$ is calculated as $\alpha_n(x)=\mu_n(x)+\beta_n\sigma_n(x)$ using an arbitrary constant $\beta_n$.

The acquisition function maximization function is a function of calculating a next input parameter that maximizes the acquisition function. For example, the parameter that maximizes the acquisition function is expressed by Formula (2).

$$X_{n+1}=\text{argmax } \alpha_n(x) \tag{2}$$

A parameter of Formula (2) is obtained, and the next input parameter $x_{n+1}$ is determined. The maximization of this acquisition function may use any optimization method. For example, a full search, a random search, a grid search, a gradient method, L-BFGS, DIRECT, CMA-ES, or a multi-start local method may be used.

As described above, in the fourth embodiment, when the Bayesian optimization is performed, the evaluation value is converted into the converted evaluation value, and the next input parameter is calculated on the basis of the parameter and the converted evaluation value. Therefore, even in a case where an outlier is included in the evaluation value, the estimation of the relational expression between the average value and the variance in the Bayesian optimization is less likely to overfit to the outlier, so that the tendency to contribute to the optimization can be estimated more correctly. Therefore, even when the evaluation value includes an outlier, the input parameter optimization processing can be quickly performed.

Fifth Embodiment

Figure 8:
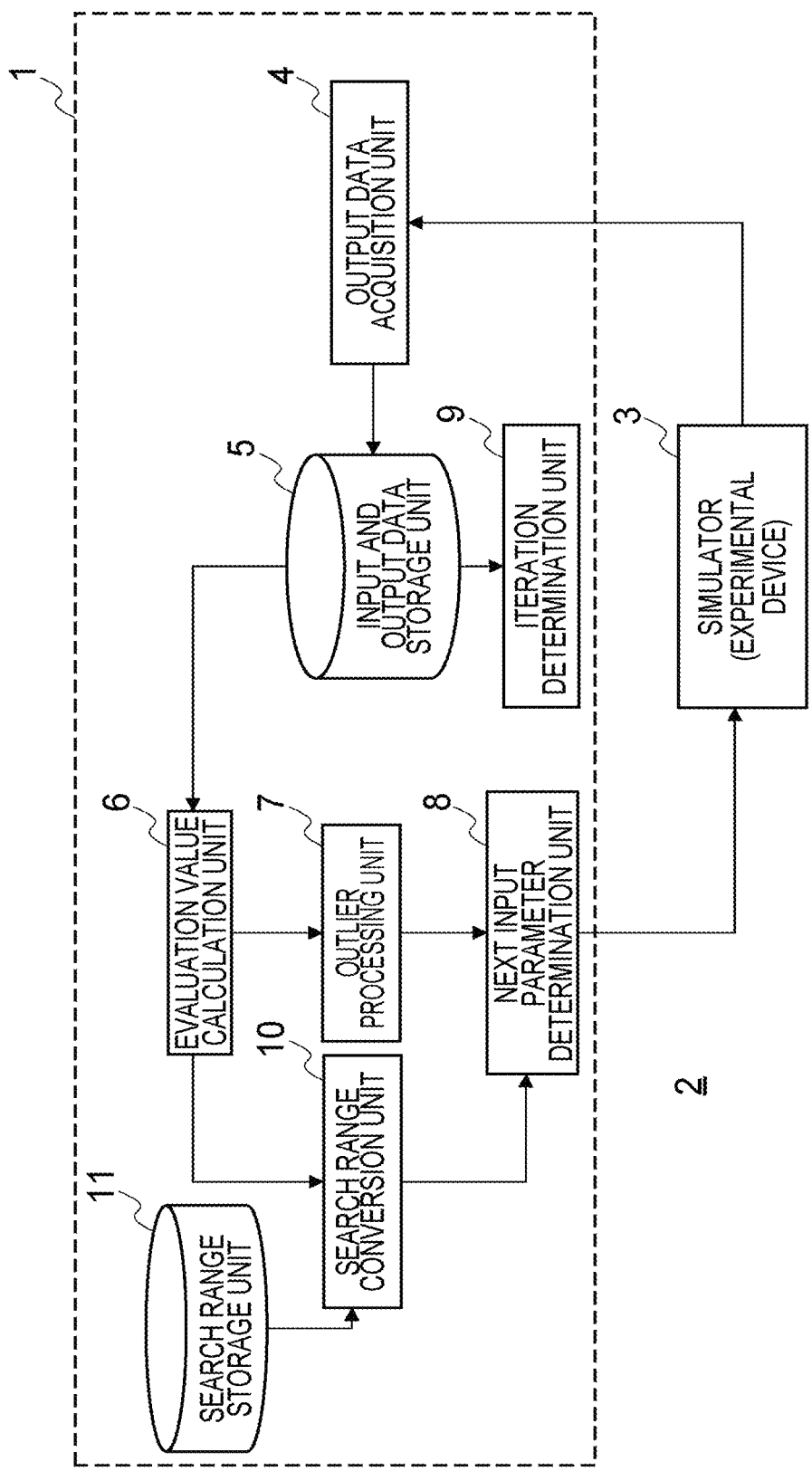
FIG. 8 is a block diagram of the simulation system 2 including the information processing apparatus 1 according to a fifth embodiment.

FIG. 8 is a block diagram of the simulation system 2 including the information processing apparatus 1 according to a fifth embodiment. The information processing apparatus 1 according to the fifth embodiment has a configuration in which a search range conversion unit 10 and a search range storage unit 11 are added to the information processing apparatus 1 in FIG. 1. The search range conversion unit 10 and the search range storage unit 11 may be incorporated in the next input parameter determination unit 8. The calculation result of the next input parameter determination unit 8 may be input to the search range conversion unit 10.

The search range conversion unit 10 outputs a converted search range in which the search range is limited by using some dimensions of the input parameter as selected dimensions. In the converted search range, the search range of dimensions other than the selected dimensions of the input parameter is unchanged. More specifically, the search range conversion unit 10 sets some of the dimensions of the input parameter as the selected dimensions on the basis of a predetermined rule or a random selection criterion. Alternatively, the search range conversion unit 10 may set the value of the input parameter of the selected dimensions to a fixed value on the basis of the value of the input parameter of the selected dimensions when the evaluation value is within a predetermined rank. Alternatively, the search range conversion unit 10 may set the number of input parameters to be the selected dimensions on the basis of a predetermined rule or a random selection criterion.

The next input parameter determination unit 8 determines the next input parameter on the basis of the input parameter, the corresponding converted evaluation value, and the converted search range.

The search range storage unit 11 stores the converted search range set by the search range conversion unit 10. FIG. 9 is a diagram illustrating an example of the converted search range stored in the search range storage unit 11. The first column of FIG. 9A indicates the identification names of the dimensions x1, x2, x3, . . . , x11 of the input parameters, the second column indicates the upper limit of the search range of each dimension, and the third column indicates the lower limit of the search range of each dimension. FIGS. 9B and 9C are diagrams illustrating examples of converted search ranges obtained by converting the search ranges of the input parameters. The dimension in which the values of the second column and the third column in FIGS. 9B and 9C are equal indicates that the search range is fixed and the value of the input parameter is fixed. For the dimensions of the other columns, corresponding search ranges are set. The converted search range may be a search range of an acquisition function.

For example, the user may input the number of selected dimensions, and the search range conversion unit 10 may determine the selected dimensions according to a uniform distribution. The search range of the selected dimension may fix values of some dimensions of the input parameter when the evaluation value takes the best value in the evaluated data. (Method 1) For example, it is assumed that the search ranges of the input parameters x1, x2, . . . , x11 are as illustrated in FIG. 9A. It is assumed that x2 and x11 are selected as selected dimensions as a result of randomly selecting two dimensions. At this time, when x2 is 0.8 and x11 is 0.5 when the evaluation value takes the best value among the evaluated data, as illustrated in FIG. 9B, the values may be fixed for the selected dimensions of x2 and x11, and the search range may be set for other dimensions.

The search ranges of the selected dimensions x2 and x11 may be determined to be random values according to a uniform distribution (Method 2). Method 1 may be performed with the probability 1−ε by applying the ε greedy method, or Method 2 may be performed with the probability ε.

As described above, by fixing the search range of the selected dimensions, which are some of the dimensions of the input parameter, to a predetermined value, when the evaluation value rapidly changes with respect to the local variation of the input parameter, the change can be easily grasped. If a certain input parameter causes a sudden change in the evaluation value, such a certain input parameter is considered to have a strong main effect, and is easily found even if search is performed with other input parameters fixed. When the objective function value is improved by fixing the search range of some dimensions of the input parameter to the value of the input parameter when the evaluation value takes the best value, if the acquired function is maximized in a state where the value of the certain input parameter is fixed, the influence of other input parameters that have been buried by the influence of the input parameter having a large influence can be easily understood, and further, other input parameters can be easily improved. By adding such processing, local tendencies that cannot be captured after the outlier processing unit 7 prevents overfitting of outliers are easily captured.

Alternatively, the selected dimension of the input parameter may be selected according to a probability different for each dimension. Alternatively, ε of the ε greedy method may be changed depending on the dimension of the input parameter.

Alternatively, the search range of the selected dimension of the input parameter may be fixed to the value of the selected dimension of the input parameter when the evaluation value within a predetermined rank is obtained in the evaluated data. For example, in a case where the predetermined rank is within the fifth rank, one input parameter may be randomly selected from the input parameters whose evaluation values are within the fifth rank, the value of the selected dimension of the selected input parameter may be fixed, and a predetermined search range may be set for the input parameters of other dimensions. The predetermined rank may be the top N %. An effect that the local solution is hardly supplemented can be obtained by using the input parameter that takes the evaluation value within the predetermined rank instead of using only the input parameter that takes the best value.

Alternatively, the number of selected dimensions may be selected according to a uniform distribution from integer values from 0 to the number of search dimensions, and the search range of the selected dimensions may be set to a range near the input parameter value when the evaluation value takes the best value among the evaluated data. The vicinity may be, for example, ±N % of the best value. That is, the search range can be set to a range of [the best value×(100−N)÷100] or more and [the best value×(100+N)÷100] or less. Hereinafter, the lower limit value and the upper limit value of the search range are described as [lower limit value, upper limit value].

For example, in a case where the original search range of the input parameters x1, x2, x3 is x1[0, 5], x2[0, 5], x3[0, 5], the best value of the evaluation value is (1, 4, 5), and the selected dimensions are x1 and x2, and the neighborhood N of the best value is N=10, the search range of the input parameters x1, x2, x3 is set as x1 [1×0.9, 1×1.1], x2 [4×0.9, 4×1.1], x3 [0, 5].

FIG. 9A is a diagram illustrating an example of an original search range of input parameters x1, x2, . . . , x11. It is assumed that x2 and x11 are selected as a result of randomly selecting two dimensions among the input parameters in FIG. 9A (FIG. 9B). At this time, if x2 when the evaluation value takes the best value among the evaluated data is 0.8, x11 is 0.5, and the neighboring range is ±10% of the best value, the converted search range is as illustrated in FIG. 9C.

The neighboring range may be determined according to a random number. For example, one value of N in the range of ±N % of the best value may be determined from a continuous value of A (for example, 0) to B (for example, 10) according to a uniform distribution. This may be performed for each dimension, and different neighboring ranges may be set for each dimension. The range of ±0% is the best value itself. In a case of A=0, the search is made wider as B is larger, and the search is made narrower as B is smaller. Therefore, for example, B may be increased at the early stage of the search when the uncertainty of the best value of the input parameter is high, and B may be decreased at the final stage of the search.

In the case of multi-point simultaneous recommendation (batch recommendation), the number of dimensions, selection of dimensions, and the size of a neighboring range may be changed every time one element of a batch is determined.

Figure 10:
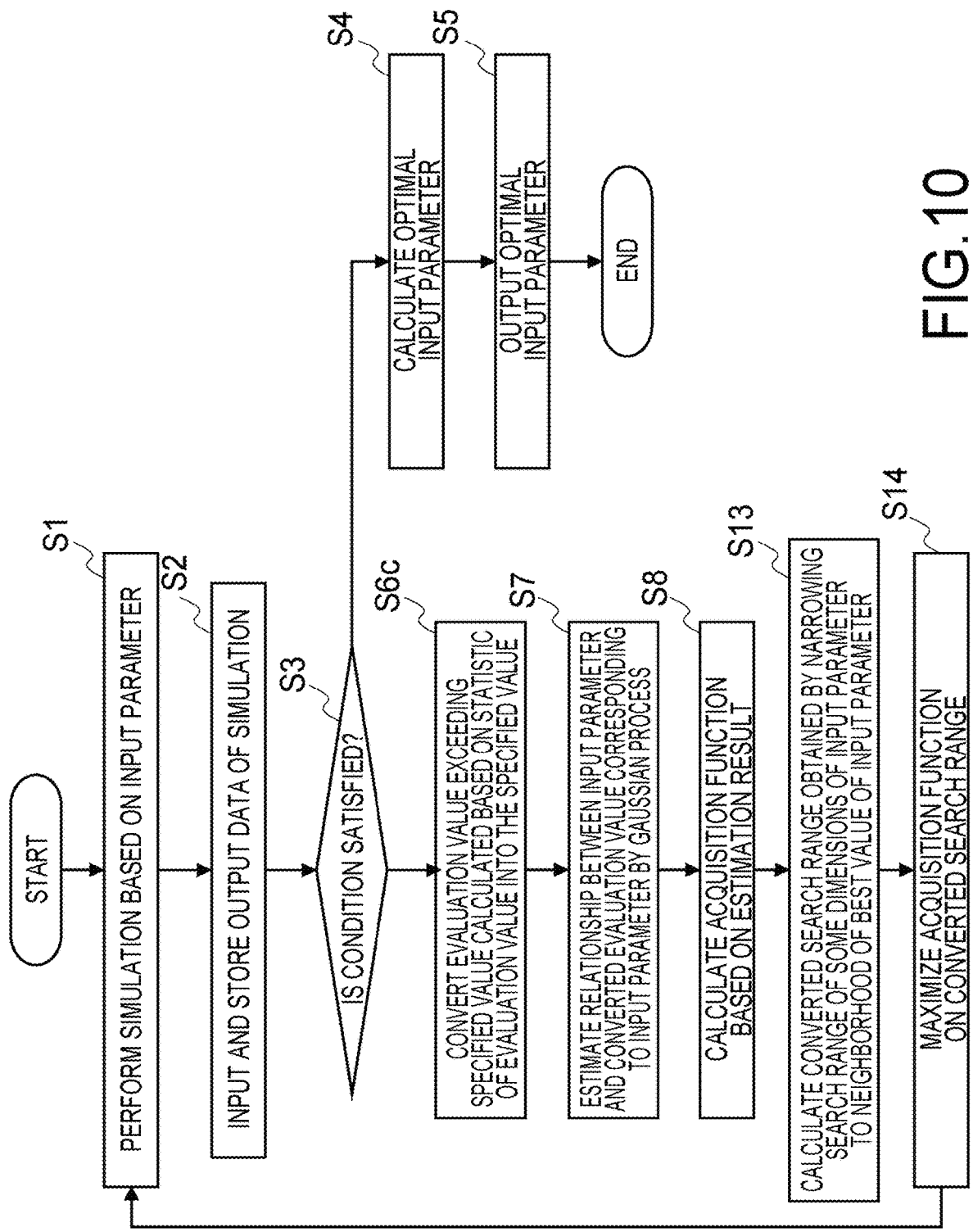
FIG. 10 is a flowchart of a simulation system according to the fifth embodiment.

FIG. 10 is a flowchart of the simulation system 2 according to the fifth embodiment. The flowchart of FIG. 10 is obtained by adding the processing of steps S13 and S14 to the flowchart of FIG. 5. In step S13, as an example of processing of generating a converted search range for changing the search range of the selected dimensions which are the selected search dimensions, a converted search range in which the search range of some dimensions of the input parameter is narrowed to the neighborhood of the input parameters is calculated. In step S14, the converted search range is the search range at the time of maximizing the acquisition function.

As described above, in the fifth embodiment, the converted evaluation value obtained by converting the evaluation value exceeding the specified value into the specified value is calculated, the next input parameter is determined on the basis of the input parameter and the corresponding converted evaluation value, and the search range is limited with some of the dimensions of the input parameter as the selected dimension, so that the local tendency can be more easily grasped.

Sixth Embodiment

A sixth embodiment relates to handling when data that violates a constraint is obtained when an experiment or simulation is performed using input parameters.

Figure 11:
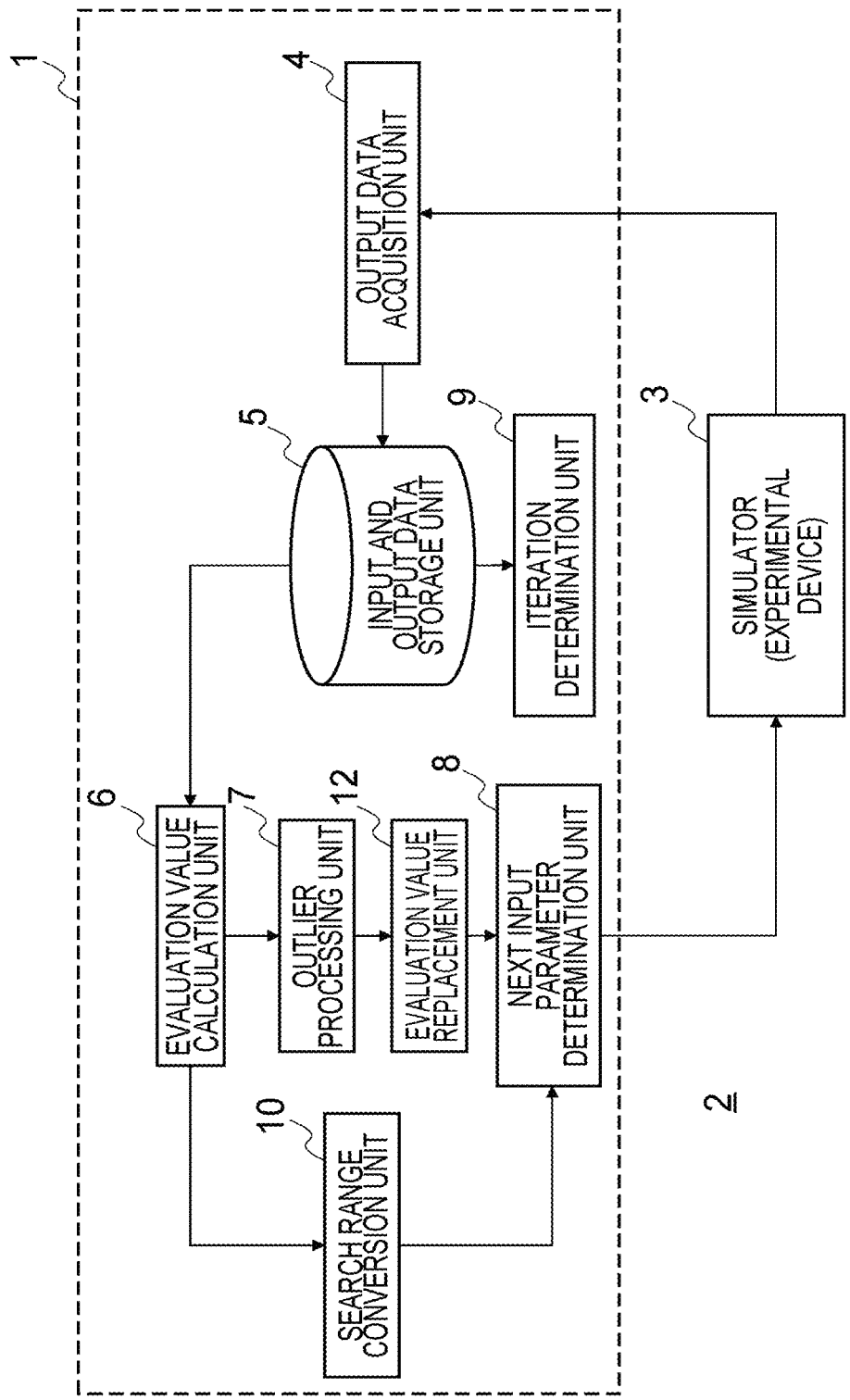
FIG. 11 is a block diagram of a simulation system including an information processing apparatus according to a sixth embodiment.

FIG. 11 is a block diagram of the simulation system 2 including the information processing apparatus 1 according to a sixth embodiment. The simulation system 2 of FIG. 11 is different from that of FIG. 8 in that an evaluation value replacement unit 12 is added, and is configured similarly to FIG. 8 except for this. The search range storage unit is omitted.

The evaluation value calculation unit 6 in FIG. 11 includes an ideal output data storage unit 6a and an error calculation unit 6b. The ideal output data storage unit 6a stores an ideal experiment or simulation output result. For example, in a case where the items of the output data are y1, y2, . . . , y10, the ideal output result may be 10 values corresponding to these 10 items, or may be values of some items.

The error calculation unit 6b calculates an error between the output data of the experiment or simulation and the ideal output result as an evaluation value. For example, assuming that output data of the i-th item obtained by an experiment or simulation is yi and an ideal output result of the i-th item is yi bar (in the present specification, a symbol having a horizontal line above the symbol is referred to as a "symbol bar"), the error y is expressed by the following Formula (3).

$$y = \Sigma_i \|y_i - \overline{y_i}\| \quad (3)$$

Here, $\|\ \|$ may be the Lp norm shown in Formula (4) or the infinite norm shown in Formula (5).

$$\|q\| = \sqrt[p]{\Sigma_j |q_j|^2} \quad (4)$$

$$\|q\| = \max_j |q_j| \quad (5)$$

The evaluation value calculation unit 6 may output the evaluation value to the outlier processing unit in a form in which the evaluation value can be recognized as the constraint violation in consideration of a case where the experiment or the simulation violates the constraint. Here, the constraint violation may be failure. Failure means that part of output data is lost for a certain input parameter. For example, it is a failure that a product of an experiment cannot be generated, and as a result, part of output data is lost, or a result is not returned due to a bug in a simulation. Alternatively, a case where the result of the experiment exceeds the expectation, the measurement cannot be performed, and the output data is missing is also a failure. Since the output data is missing, there is an input parameter in which the evaluation value also becomes a missing value. Alternatively, the violation of the constraint may be a constraint expression to be satisfied by the output data. For example, even in a case where part of the output data is not lost, if the requested constraint may not be satisfied and the data is to be avoided, it may be regarded as a violation of the constraint.

When there is data of the constraint violation, the evaluation value $\underline{y}$ obtained by excluding the evaluation value of the input parameter of the constraint violation may be input to the outlier processing unit to calculate the converted evaluation value $\underline{Y}$.

The evaluation value replacement unit 12 may replaces the converted evaluation value corresponding to the input parameter of the constraint violation with the maximum value or the minimum value of the converted evaluation value calculated from the evaluation value $\bar{y}$ obtained by excluding the evaluation value of the input parameter of the constraint violation. That is, when the evaluation value of the n-th experiment that is not of the constraint violation is yn, the evaluation value corresponding to the input parameter of the constraint violation may be replaced with $\min_n y_n$ or $\max_n y_n$.

For example, in a case where the evaluation value is minimized, the evaluation value replacement unit 12 replaces the evaluation value for the input parameter for which the experiment or simulation has failed with the maximum value of the evaluation value. Similarly, when it is desired to maximize the evaluation value, the evaluation for the input parameter for which the experiment or simulation has failed is replaced with the minimum value of the converted evaluation value.

As described above, in the sixth embodiment, since the evaluation value in a case where the experiment or simulation for a certain input parameter has failed is determined on the basis of the maximum value or the minimum value of the converted evaluation value, it is possible to prevent the failed result from being filled with the outlier. Therefore, it is possible to avoid the input parameters of the constraint violation while preventing excessive fitting to the outlier of the prediction model.

Seventh Embodiment

Figure 12:
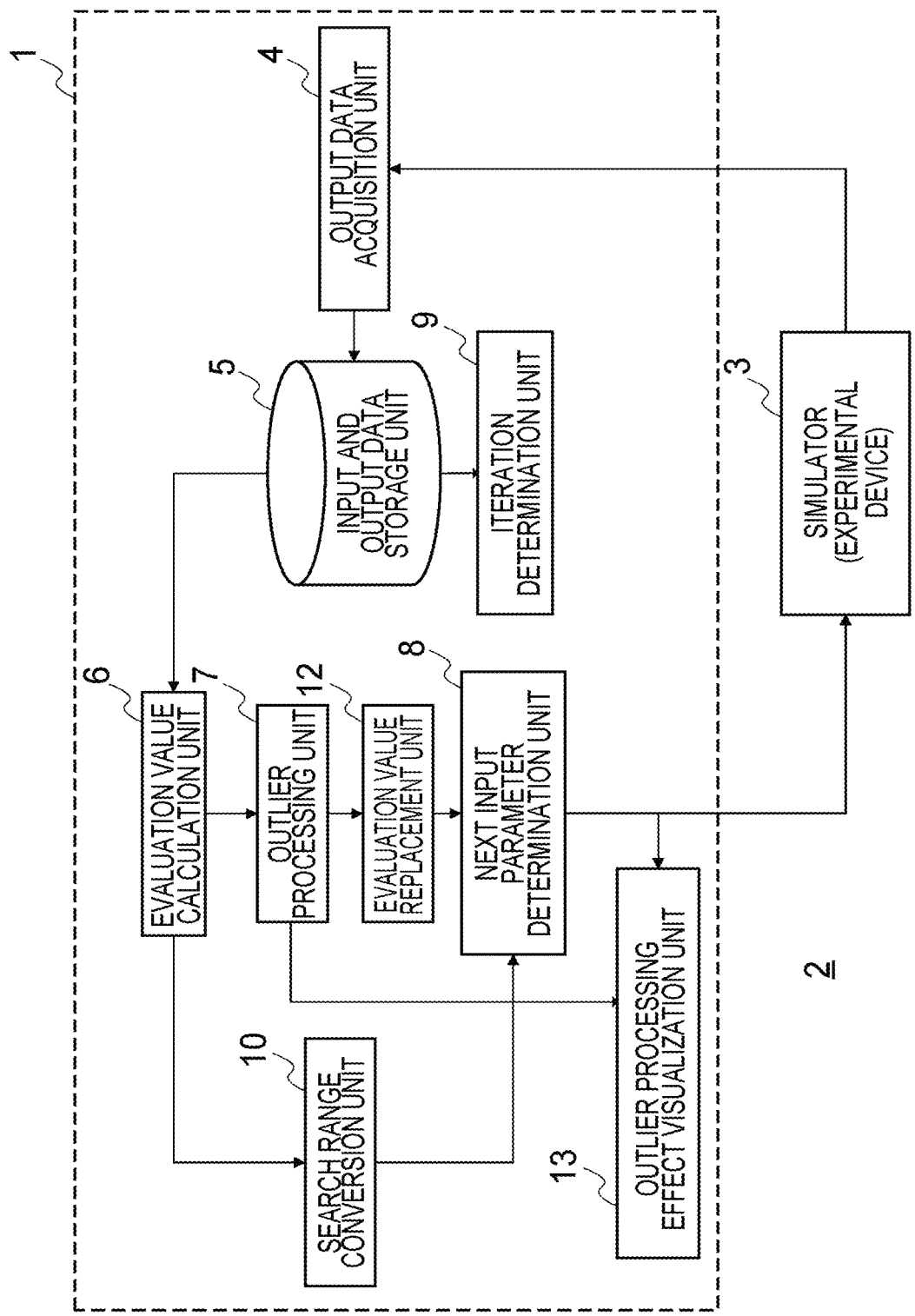
FIG. 12 is a block diagram of the simulation system 2 including an information processing apparatus according to a seventh embodiment.

A seventh embodiment relates to a case of checking an effect of outlier processing by visualizing a difference before and after processing by an outlier processing unit. FIG. 12 is a block diagram of the simulation system 2 including the information processing apparatus 1 according to the seventh embodiment. The simulation system 2 of FIG. 12 has a configuration in which an outlier processing effect visualization unit is added to the configuration of FIG. 11, and other configurations are similar to those of FIG. 11.

The outlier processing effect visualization unit in FIG. 12 visualizes the relationship between the evaluation value, the converted evaluation value, or the evaluation values excluding the outlier and the input parameter constituting a set, the relationship between the input parameter and the evaluation value, the converted evaluation value, the average value of the evaluation values excluding the outlier, or the estimated value of variance, or the acquisition function value. Here, for example, in a case where the outlier processing unit converts an evaluation value exceeding a specified value into a specified value with a 50 percentile value of the evaluation value as the specified value, the evaluation value exceeding the specified value is the outlier.

Figure 13:
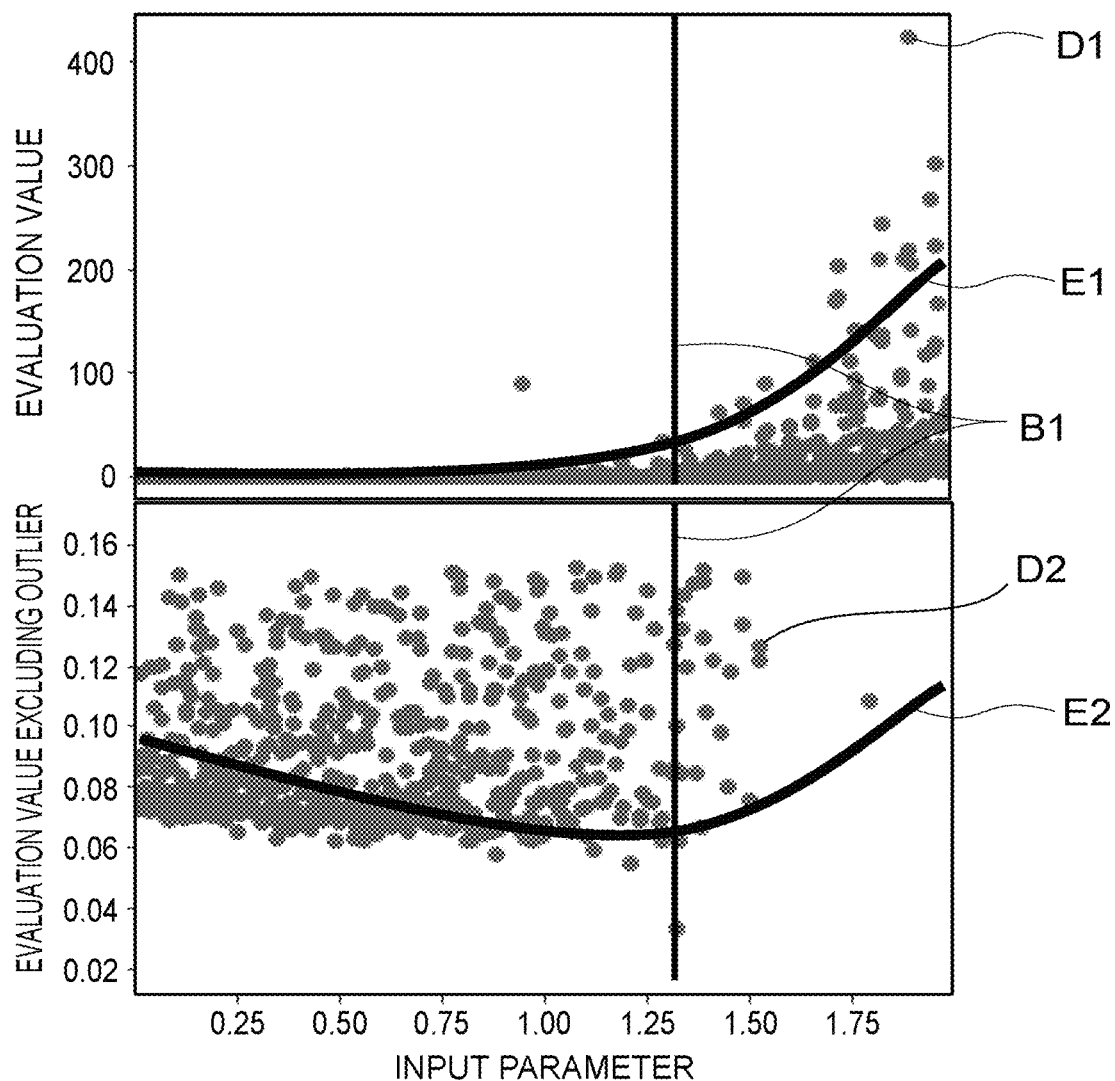
FIG. 13 is a schematic diagram of a visualization result of an estimated value of an average of input parameters and evaluation values and an estimated value of an average of input parameters and evaluation values excluding outliers.

FIG. 13 is a schematic diagram illustrating a visualization result of the relationship between the evaluation value and the input parameter constituting a set, the relationship between the evaluation value excluding the outlier and the input parameter constituting a set, the estimated value of the input parameter and the average of the evaluation values, and the input parameter and the estimated value of the average of the evaluation values excluding the outlier. A plot D1 in FIG. 13 is a point group indicating a correspondence relationship between a certain dimension of an input parameter and an evaluation value, and a plot D2 in FIG. 13 is a point group indicating a correspondence relationship between a certain dimension of an input parameter and evaluation values obtained by excluding evaluation values exceeding the 50 percentile value as outliers. A waveform E1 in FIG. 12 is an estimated value of a schematic average of schematically illustrated evaluation values, and a waveform E2 in FIG. 13 is an estimated value of a schematic average of evaluation values obtained by excluding evaluation values exceeding the 50 percentile value as outliers. A straight line B1 indicates the value of the input parameter when the minimum value of the evaluation value is taken.

As described above, by arranging and comparing the obtained evaluation values, the evaluation values excluding the outliers, the minimum value of the evaluation values, and the input parameters, it is possible to check whether the appearance of the tendency of the data is likely to change in a case where the outliers are excluded, or whether a good evaluation value can be acquired by searching for the optimal value according to the estimated value of the average of the evaluation values in a case where the outliers are excluded. In the case of FIG. 13, there is a relationship in which the evaluation value rapidly increases when the input parameter value is large, and it is possible to easily confirm that the prediction model of the Bayesian optimization overfits such a large evaluation value. On the other hand, such a large evaluation value is excluded as an outlier when a predetermined specified value of the outlier processing unit is set to a 50 percentile value. In the case of FIG. 13, when a region in which the waveform E1 is small in FIG. 13 is compared with the region in which the waveform E2 is small in FIG. 13, it can be seen that the region in which the waveform E2 is small in FIG. 13 is closer to the input parameter when the minimum value of the evaluation value is taken, and it can be confirmed that the input parameter value at which the best evaluation value is obtained among at least the obtained evaluation values can be estimated well in the case of processing the outlier.

Therefore, in the case of solving an optimization problem without knowledge, it is difficult to determine whether an outlier is a problem to be processed, but it is possible to confirm whether it is better to simply process the outlier by comparing the relationship between the input parameters and the evaluation values and the evaluation values excluding the outliers.

The information processing apparatus 1 according to the first to seventh embodiments described above can be applied to experiments and simulations of various events. As a specific example of the information processing apparatus 1 according to the first to seventh embodiments, it is conceivable to optimize the input parameters so that the shape of the semiconductor device becomes a predetermined shape. In recent semiconductor devices, film formation conditions such as a temperature and a material are finely controlled to stack a large number of films, and then the films are often processed into a desired shape by lithography or the like. In order to evaluate whether or not the finally obtained shape of the semiconductor device is a desired shape, the information processing apparatus 1 according to the first to seventh embodiments can be used. In this case, the input parameter is the film-forming condition described above. The input parameters include a plurality of items such as a film formation temperature, a material, and a film formation time, and adjusting these items changes the shape of the finally obtained semiconductor device. Therefore, by using the information processing apparatus 1 described above, it is possible to select an optimal input parameter so that the semiconductor device has a desired shape.

At least a part of the information processing apparatus 1 and the simulation system 2 described in each of the above-described embodiments may be configured by hardware or software. When the functions are configured by software, a program that realizes at least part of the functions of the information processing apparatus 1 and the simulation system 2 may be accommodated in a storage medium such as a flexible disc, and a CD-ROM, and a computer may read and execute the program. The storage medium is not limited to the one that is attachable and detachable such as a magnetic disc and an optical disc, and may be a fixed-type storage medium such as a hard disc device and a memory.

A program that realizes at least part of the functions of the information processing apparatus 1 and the simulation system 2 may be distributed via a communication line (including wireless communication) such as the Internet. The program may be distributed via a wired line or a wireless line such as the Internet, or stored in a storage medium, in a state of being encrypted, modulated, or compressed.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus comprising processing circuitry configured to:
    acquire an output value obtained by performing an experiment or simulation based on an input parameter of a predetermined number of dimensions;
    calculate and output an evaluation value for evaluating the output value;
    output a converted evaluation value including a specified value obtained by converting the evaluation value that does not satisfy a predetermined criterion;
    determine a next input parameter based on the input parameter and the converted evaluation value corresponding to the input parameter;
    repeat operations of acquiring the output value, calculating and outputting the evaluation value, outputting the converted evaluation value, and determining the next input parameter until a predetermined condition is satisfied;
    output input parameters having satisfied the predetermined condition as optimum input parameters including film forming conditions to be selected so that a semiconductor device has a desired shape; and
    process the semiconductor device into the desired shape based on the optimum input parameters including the film forming conditions.

2. The information processing apparatus according to claim 1,
    wherein the processing circuitry is further configured to determine the specified value based on a statistic of the evaluation value.

3. The information processing apparatus according to claim 1,
    wherein the processing circuitry is further configured to determine whether the predetermined criterion is satisfied based on a percentile value of the evaluation value, and
    the specified value is a specific percentile value of the evaluation value.

4. The information processing apparatus according to claim 1, wherein the processing circuitry is further configured to:
    learn whether the evaluation value is the outlier using data of the outlier and data that is not the outlier as training data, and
    convert the evaluation value determined to be the outlier by the classifier into a percentile value of the evaluation value determined not to be the outlier by the classifier.

5. The information processing apparatus according to claim 1,
    wherein the processing circuitry is further configured to determine that the evaluation value exceeding or falling below the specified value does not satisfy the predetermined criterion and converts the evaluation value into the specified value.

6. The information processing apparatus according to claim 1,
    wherein the processing circuitry is further configured to determine that the evaluation value is out of a range between a specified upper limit value and a specified lower limit value does not satisfy the predetermined criterion and converts the evaluation value into the specified value.

7. The information processing apparatus according to claim 6,
    wherein the processing circuitry is further configured to determine the specified upper limit value and the specified lower limit value based on a statistic of the evaluation value.

8. The information processing apparatus according to claim 6,
    wherein the processing circuitry is further configured to determine at least one of the specified upper limit value and the specified lower limit value based on a percentile value of the evaluation value.

9. The information processing apparatus according to claim 6,
    wherein the processing circuitry is further configured to set the specified value to the specified upper limit value or the specified lower limit value.

10. The information processing apparatus according to claim 6,
    wherein the processing circuitry is further configured to set the specified value to an average value of estimated values of the evaluation value.

11. The information processing apparatus according to claim 6,
    wherein, when an evaluation value of the next input parameter is out of the range between the specified upper limit value and the specified lower limit value, the processing circuitry is further configured to repeat the evaluation of the next input parameter a predetermined number of times, and set an average value or a percentile value of a result of repeated evaluation as the evaluation value of the next input parameter.

12. The information processing apparatus according to claim 1,
    wherein the processing circuitry is further configured to convert the evaluation value into a value among a plurality of values, the plurality of values being different by a fixed value, respectively, and output the converted value.

13. The information processing apparatus according to claim 1,
wherein the processing circuitry is further configured to convert the evaluation value into a different value assigned in the same order, and output the converted evaluation value.

14. The information processing apparatus according to claim 1,
wherein the processing circuitry is further configured to output the converted evaluation value obtained by converting each of the evaluation value into a quantile value with respect to an entire evaluation value.

15. The information processing apparatus according to claim 1, wherein the processing circuitry is further configured to:
output a converted search range that is a limited search range by using some dimensions of the input parameter as selected dimensions; and
determine the next input parameter based on the input parameter, the converted evaluation value corresponding to the input parameter, and the converted search range.

16. An information processing apparatus comprising processing circuitry configured to:
acquire an output value obtained by performing an experiment or simulation based on an input parameter of a predetermined number of dimensions;
calculate and output an evaluation value for evaluating the output value;
output a converted evaluation value including a specified value obtained by converting the evaluation value that does not satisfy a predetermined criterion;
output a converted search range that is a limited search range by using some dimensions of the input parameter as selected dimensions;
determine a next input parameter based on the input parameter, the converted evaluation value corresponding to the input parameter, and the converted search range;
repeat operations of acquiring the output value, calculating and outputting the evaluation value, outputting the converted evaluation value, outputting the converted search range, and determining the next input parameter until a predetermined condition is satisfied;
output input parameters having satisfied the predetermined condition as optimum input parameters including film forming conditions to be selected so that a semiconductor device has a desired shape; and
process the semiconductor device into the desired shape based on the optimum input parameters including the film forming conditions.

17. The information processing apparatus according to claim 15,
wherein the processing circuitry is further configured to set some dimensions of the input parameter as the selected dimensions based on a predetermined rule or a random selection criterion.

18. The information processing apparatus according to claim 15,
wherein the processing circuitry is further configured to output the converted search range in which a value of the input parameter of the selected dimensions when the evaluation value takes a best value for the evaluation value is a fixed value.

19. The information processing apparatus according to claim 15,
wherein the processing circuitry is further configured to set a value of the input parameter of the selected dimensions to a fixed value based on the value of the input parameter of the selected dimensions when the evaluation value is within a predetermined rank.

20. The information processing apparatus according to claim 15,
wherein the processing circuitry is further configured to set a value of the input parameter of the selected dimensions to a fixed value based on the value of the input parameter of the selected dimensions when the evaluation value is within a range of deviation from a best value for the evaluation value by a predetermined value.

21. The information processing apparatus according to claim 15,
wherein the processing circuitry is further configured to set a number of the input parameter to be the selected dimensions based on a predetermined rule or a random selection criterion.

22. The information processing apparatus according to claim 1,
wherein the processing circuitry is further configured to:
calculate an acquisition function based on a relational expression between the input parameter and an average value of the converted evaluation value corresponding to the input parameter and a relational expression between the input parameter and a variance of the converted evaluation value corresponding to the input parameter; and
determine the next input parameter such that the acquisition function is maximized.

23. The information processing apparatus according to claim 1,
wherein the processing circuitry is further configured to, when the output value or the evaluation value corresponding to the input parameter is determined to be a constraint violation, replace the evaluation value desired to be maximized with a minimum value of the converted evaluation value of another input parameter or replaces the evaluation value desired to be minimized with a maximum value of the converted evaluation value of another input parameter.

24. The information processing apparatus according to claim 1,
wherein the processing circuitry is further configured to visualize at least one of a relationship between the input parameter and at least one of the evaluation value, the converted evaluation value, and the evaluation value excluding an outlier, a relationship between the input parameter and an estimated value of an average value or variance of at least one of the evaluation value, the converted evaluation value, and the evaluation value excluding an outlier, and an acquisition function value calculated based on these relationships.

25. An information processing method comprising:
acquiring an output value obtained by performing an experiment or simulation based on an input parameter of a predetermined number of dimensions;
calculating and outputting an evaluation value for evaluating the output value;
outputting a converted evaluation value including a specified value obtained by converting the evaluation value that does not satisfy a predetermined criterion;

determining a next input parameter based on the input parameter and the converted evaluation value corresponding to the input parameter;

repeating processing of the acquiring of the output value, the calculating of the evaluation value, the outputting of the converted estimation value, and the determining of the next input parameter until a predetermined condition is satisfied;

outputting input parameters having satisfied the predetermined condition as optimum input parameters including film forming conditions to be selected so that a semiconductor device has a desired shape; and processing the semiconductor device into the desired shape based on the optimum input parameters including the film forming conditions.

26. An information processing method comprising:

acquiring an output value obtained by performing an experiment or simulation based on an input parameter of a predetermined number of dimensions;

calculating and outputting an evaluation value for evaluating the output value;

outputting a converted evaluation value including a specified value obtained by converting the evaluation value that does not satisfy a predetermined criterion;

outputting a converted search range that is a limited search range by using some dimensions of the input parameter as selected dimensions;

determining a next input parameter based on the input parameter, the converted evaluation value corresponding to the input parameter, and the converted search range;

repeating processing of the acquiring of the output value, the calculating of the evaluation value, the outputting of the converted search range, and the determining of the next input parameter until a predetermined condition is satisfied;

outputting input parameters having satisfied the predetermined condition as optimum input parameters including film forming conditions to be selected so that a semiconductor device has a desired shape; and processing the semiconductor device into the desired shape based on the optimum input parameters including the film forming conditions.

* * * * *